(12) United States Patent
Kamitsuji et al.

(10) Patent No.: US 11,947,970 B2
(45) Date of Patent: Apr. 2, 2024

(54) INFORMATION PROCESSING DEVICE, MOVING OBJECT, AND INFORMATION PROCESSING METHOD

(71) Applicant: Panasonic Intellectual Property Management Co., Ltd., Osaka (JP)

(72) Inventors: Takahiko Kamitsuji, Osaka (JP); Daiki Matsuda, Osaka (JP); Hirokazu Tamano, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 162 days.

(21) Appl. No.: 17/493,286

(22) Filed: Oct. 4, 2021

(65) Prior Publication Data

US 2022/0027166 A1  Jan. 27, 2022

Related U.S. Application Data

(63) Continuation of application No. PCT/JP2020/043029, filed on Nov. 18, 2020.

(30) Foreign Application Priority Data

Dec. 9, 2019  (JP) ................................ 2019-221804

(51) Int. Cl.
*G06F 9/44* (2018.01)
*G06F 8/65* (2018.01)
*G06F 9/445* (2018.01)

(52) U.S. Cl.
CPC ................ *G06F 9/445* (2013.01); *G06F 8/65* (2013.01)

(58) Field of Classification Search
CPC .................................. G06F 9/445; G06F 8/65
See application file for complete search history.

(56) References Cited

U.S. PATENT DOCUMENTS

2006/0259207 A1   11/2006  Natsume
2017/0134164 A1*  5/2017   Haga ........................ G06F 8/65
(Continued)

FOREIGN PATENT DOCUMENTS

JP   2006-301960   11/2006
JP   2019-144806   8/2019

OTHER PUBLICATIONS

Official Communication issued in International Pat. Appl. No. PCT/JP2020/043029, dated Feb. 16, 2021, along with an English translation thereof.
(Continued)

*Primary Examiner* — Zahid Choudhury
(74) *Attorney, Agent, or Firm* — Greenblum & Bernstein, P.L.C.

(57) ABSTRACT

An information processing device includes: an ECU; a management ECU that provides the ECU with a virtual storage including a first storage area and a second storage area, one of which stores a first program to be executed by the ECU on start-up; an update controller that obtains, from an external device, a second program that is an update to the first program, and causes a remaining one of the first storage area and the second storage area to store the second program obtained; and a switching unit that switches a program to be executed by the ECU on start-up from the first program to the second program stored in the remaining one of the storage areas, after the second program is stored in the remaining one of the storage areas.

10 Claims, 7 Drawing Sheets

(56) References Cited

U.S. PATENT DOCUMENTS

2019/0050219 A1* 2/2019 Seki .................. H04L 67/12
2019/0265966 A1* 8/2019 Shimomura ............ G06F 21/44
2019/0294429 A1* 9/2019 Mizutani ................ H04L 67/12
2020/0233653 A1* 7/2020 Fukushima ............. B60R 16/02

OTHER PUBLICATIONS

Office Action issued by the China National Intellectual Property Administration (CNIPA) in Chinese Patent Application No. 202080025847.9, dated Nov. 30, 2023, together with an English language translation of the Office Action, a Search Report issued for the Office Action, and an English language translation of the Search Report.

* cited by examiner

INFORMATION PROCESSING DEVICE, MOVING OBJECT, AND INFORMATION PROCESSING METHOD

CROSS REFERENCE TO RELATED APPLICATIONS

This is a continuation application of PCT International Application No. PCT/JP2020/043029 filed on Nov. 18, 2020, designating the United States of America, which is based on and claims priority of Japanese Patent Application No. 2019-221804 filed on Dec. 9, 2019.

FIELD

The present disclosure relates to an information processing device, a moving object, and an information processing method.

BACKGROUND

Patent Literature (PTL) 1 discloses an automobile control unit that updates software for controlling an electronic device included in an automobile. In so doing, the automobile control unit stores an update version program in a storage area different from that of the current version program. After this, the automobile control unit switches the storage area of the update version program to the storage area of the current version program.

CITATION LIST

Patent Literature

[PTL 1] Japanese Unexamined Patent Application Publication No. 2006-301960

SUMMARY

However, the automobile control unit according to PTL 1 can be improved upon. In view of this, the present disclosure provides an information processing device and others capable of improving upon the above related art.

The information processing device according to the present disclosure includes: a first controller; a second controller that provides the first controller with a virtual storage including a first storage area and a second storage area, one of which stores a first program to be executed by the first controller on start-up; an update controller that obtains, from an external device, a second program that is an update to the first program, and causes a remaining one of the first storage area and the second storage area to store the second program obtained; and a switching unit that switches a program to be executed by the first controller on start-up from the first program to the second program stored in the remaining one of the storage areas, after the second program is stored in the remaining one of the storage areas.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

The information processing device and others according to the present disclosure are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
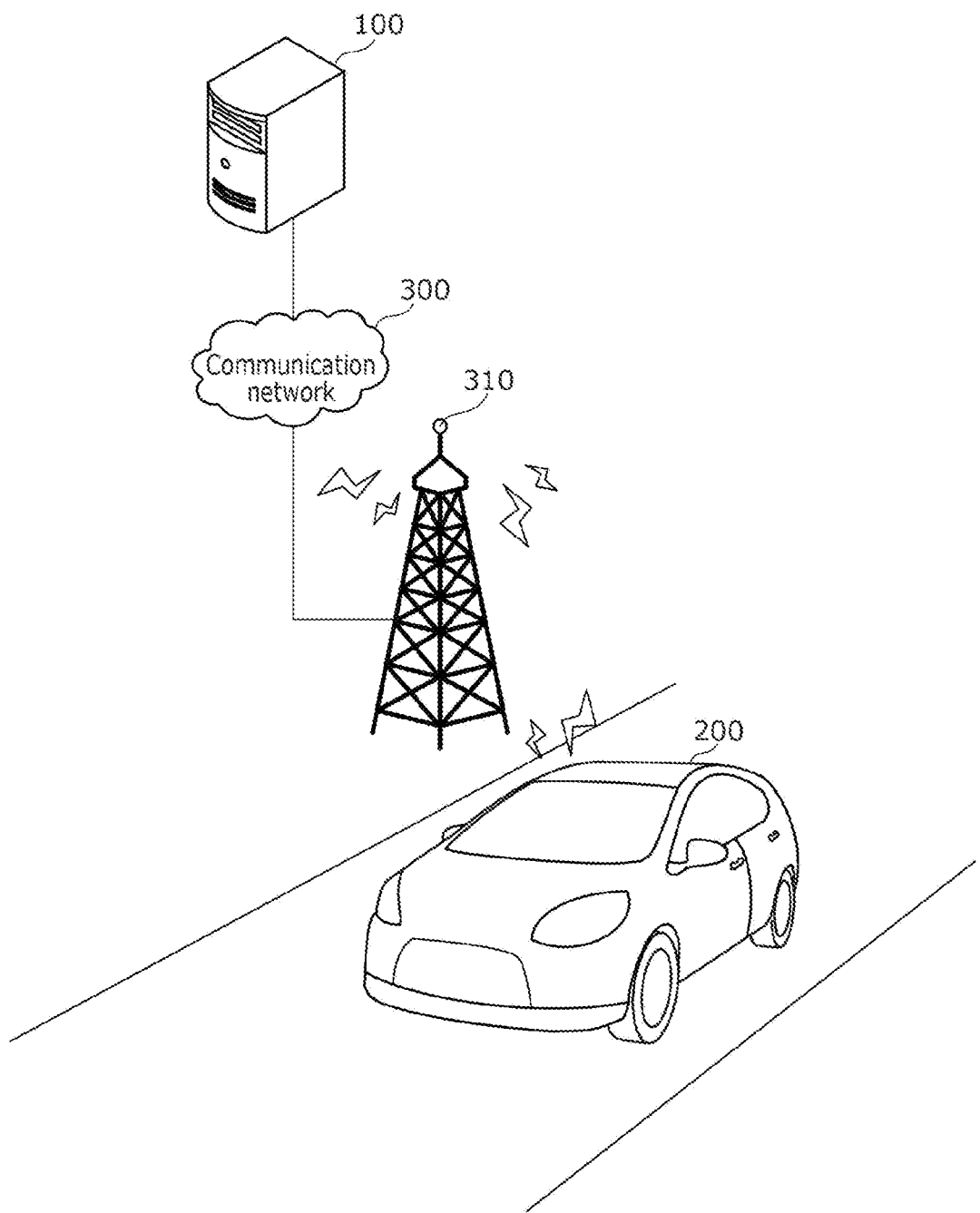
FIG. 1 is a schematic view of a data distribution system according to an embodiment.

DESCRIPTION OF EMBODIMENT (Underlying Knowledge Forming Basis of the Present Invention)

The inventors have found that the automobile control unit disclosed in the Background section has problems described below.

When an updated program has a bug and the automobile control unit (electronic control unit: ECU) disclosed in PTL 1 executes such updated program, the ECU will be unable to start up or fall into deadlock, in some cases, even if succeeded in starting up. When being unable to start up or falling in deadlock as described above, the ECU will be unable to operate. This causes a problem that, even when the new program is stored in a storage area different from that of the old program, the ECU cannot be re-started using the old program.

Also, since processing powers differ from ECU to ECU in many cases, there is a problem that variations occur in the quality of program update when a plurality of ECUs individually perform program update. When a management ECU, which is different from a target ECU to be updated, gives a program update instruction, for example, the target ECU to be updated performs program update on its own in some cases in response to the update instruction from the management ECU. To manage program update performed by ECUs so that no variations occur in the quality of program update between the ECUs, for example, the management ECU is required to take measures such as giving different program update instructions to satisfy different conditions for processing powers of the ECUs. Stated differently, the management ECU needs to be capable of managing the quality of program update performed by each of the ECUs, meaning that a program for achieving such capability needs to be prepared.

To solve the foregoing problems, the present inventors have conceived an information processing device and an information processing method that are capable of managing a program of a target controller to be updated by another controller different from the target controller to be updated, without affecting the target controller.

The information processing device according to an aspect of the present disclosure includes: a first controller; a second controller that provides the first controller with a virtual storage including a first storage area and a second storage area, one of which stores a first program to be executed by the first controller on start-up; an update controller that obtains, from an external device, a second program that is an update to the first program, and causes a remaining one of the first storage area and the second storage area to store the second program obtained; and a switching unit that switches a program to be executed by the first controller on start-up from the first program to the second program stored in the remaining one of the storage areas, after the second program is stored in the remaining one of the storage areas.

With this, the first program executed by the first controller is stored in one of the first storage area and the second storage area of the virtual storage provided by the second controller. Upon obtainment of the second program that is an update, the second program is stored in the other storage area. After that, the program to be executed by the first controller on start-up is switched to the second program, thereby enabling to update the program of the first controller without using the first controller. This configuration thus enables the update of the program of the first controller to be updated without affecting the first controller.

When an anomaly is detected in the first controller that has executed the second program, the switching unit may switch again the program to be executed by the first controller on start-up from the second program to the first program stored in the one of the storage areas.

With this, it is possible for the switching unit, not the first controller, to switch the program to be executed by the first controller on start-up from the second program to the first program, when an anomaly is detected in the second program. This enables to re-start the first controller to cause it to execute the first program that runs normally, even when the first controller becomes unable to start up or falls in deadlock as a result of executing the anomalous second program. This thus prevents the first controller from becoming unable to function.

The first controller may include the update controller.

With this, it is possible for the first controller to store the second program in the other storage area.

The second controller may include the update controller.

With this, it is possible for the second controller to store the second program in the other storage area.

The information processing device may comprise a plurality of first controllers each being the first controller, and the virtual storage provided by the second controller may include a plurality of first storage areas and a plurality of second storage areas that are accessed by the plurality of first controllers, the plurality of first storage areas each being the first storage area and the plurality of second storage areas each being the second storage area.

With this, it is possible to update the first program of each of the plurality of the first controllers without affecting the first controller.

The plurality of first controllers may include a plurality of dependent controllers having a dependence relation. For each of the plurality of dependent controllers, the virtual storage may include a first storage area and a second storage area that correspond to the dependent controller among the plurality of first storage areas and the plurality of second storage areas. One of the first storage area and the second storage area that correspond to the dependent controller may store the first program to be executed by the dependent controller on start-up. When obtaining, from the external device, the second program that is the update for the dependent controller, the update controller may cause a remaining one of the first storage area and the second storage area that correspond to the dependent controller to store the second program obtained. The switching unit may switch the program to be executed by the dependent controller on start-up from the first program to the second program stored in the remaining one of the storage areas, after the second program is stored in the remaining one of the storage areas. When an anomaly is detected in at least one of the plurality of dependent controllers that has executed the second program, the switching unit may switch again the program to be executed by each of the plurality of dependent controllers on start-up from the second program to the first program stored in the one of the storage areas.

With this, it is possible for the switching unit, not the dependent controller, to switch the program to be executed by each of all the dependent controllers on start-up from the second program to the first program when an anomaly is detected in the second program of one of the dependent controllers. This enables to re-start all of the dependent controllers to cause them to execute the first program that runs normally, even when one or more of the dependent controllers become unable to start up or fall in deadlock as a result of executing the anomalous second program, affecting another dependent controller. This thus prevents the dependent controllers from becoming unable to function.

The first controller and the second controller may be ECUs.

The first controller and the second controller may be capable of communicating with each other over CAN.

The moving object according to an aspect of the present disclosure includes: the foregoing information processing device; and a moving object main body including the information processing device.

With this, in the information processing device included in the main body of the moving object, the first program executed by the first controller is stored in one of the first storage area and the second storage area of the virtual storage provided by the second controller. Upon obtainment of the second program that is an update, the second program is stored in the other storage area. After that, the program to be executed by the first controller on start-up is switched to the second program, thereby enabling to update the program of the first controller without using the first controller. This configuration enables the update of the program of the first controller to be updated without affecting the first controller.

Note that these general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, an exemplary embodiment is described in greater detail with reference to the accompanying Drawings. Note, however, that detailed description more than necessary may be omitted. For example, detailed description of a well-known matter or repetitive description of substantially the same configurations may be omitted. This is to prevent the following description from being redundant more than necessary, and to help those skilled in the art easily understand the following description.

Also note that the attached drawings and the following description are provided, by the inventors, for those skilled in the art to fully understand the present disclosure, and thus should not be construed to limit the spirit and scope of the appended claims.

EMBODIMENT

With reference to FIG. 1 through FIG. 9, the following describes the embodiment.

[Configuration]

FIG. 1 is a schematic view of a system for distributing an update to an automobile according to the embodiment.

More specifically, FIG. 1 shows server 100, automobile 200, communication network 300, and base station 310 of a mobile communications network.

Server 100 is a device that stores a program (firmware) of an electronic device, such as an ECU, included in automobile 200. Server 100 provides automobile 200 with such program via communication network 300.

Automobile 200 is a moving object that is capable of connecting to the mobile communications network via base station 310 and performing communications.

As described above, FIG. 1 shows an exemplary configuration of updating a program of an ECU included in automobile 200 by distributing to automobile 200 an update to the program of the ECU over the air (OTA). Note that a method of updating the program of the ECU is not limited to an update method utilizing OTA; an update device may be, for example, wire-connected to automobile 200, and the update stored in a recording medium via the update device may be applied to the ECU in automobile 200.

Figure 2:
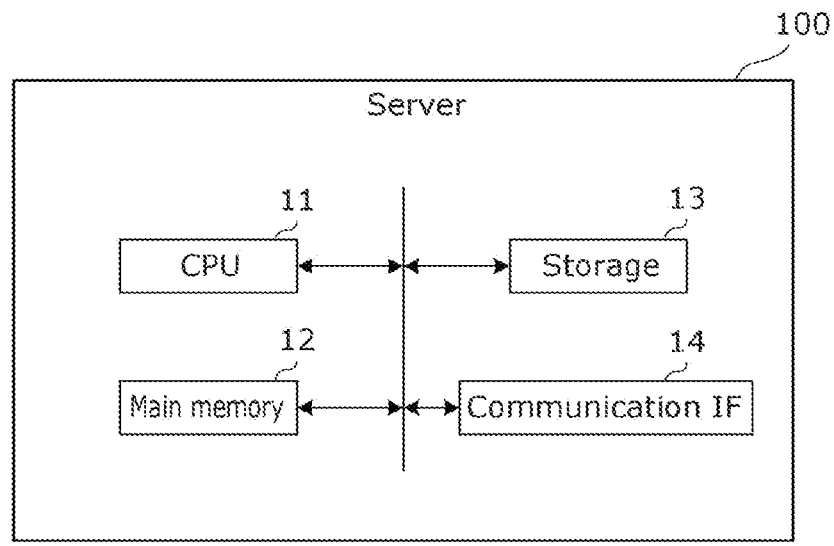
FIG. 2 is a block diagram showing an exemplary hardware configuration of a server according to the embodiment.

FIG. 2 is a block diagram showing an exemplary hardware configuration of the server according to the embodiment.

As shown in FIG. 2, server 100 includes, as hardware components, central processing unit (CPU) 11, main memory 12, storage 13, and communication interface (IF) 14.

CPU 11 is a processor that executes a control program stored in storage 13, etc.

Main memory 12 is a volatile storage area serving as a work area used by CPU 11 in executing the control program.

Storage 13 is a nonvolatile storage area in which the control program, contents, and so forth are held.

Communication IF 14 is a communication interface that communicates with a plurality of automobiles 200 over communication network 300. Communication IF 14 is, for example, a wired LAN interface. Note that communication IF 14 may also be a wireless LAN interface. Also note that communication IF 14 is not limited to a LAN interface, and thus may be any communication interface that is capable of establishing a connection with a communication network to perform communications.

Figure 3:
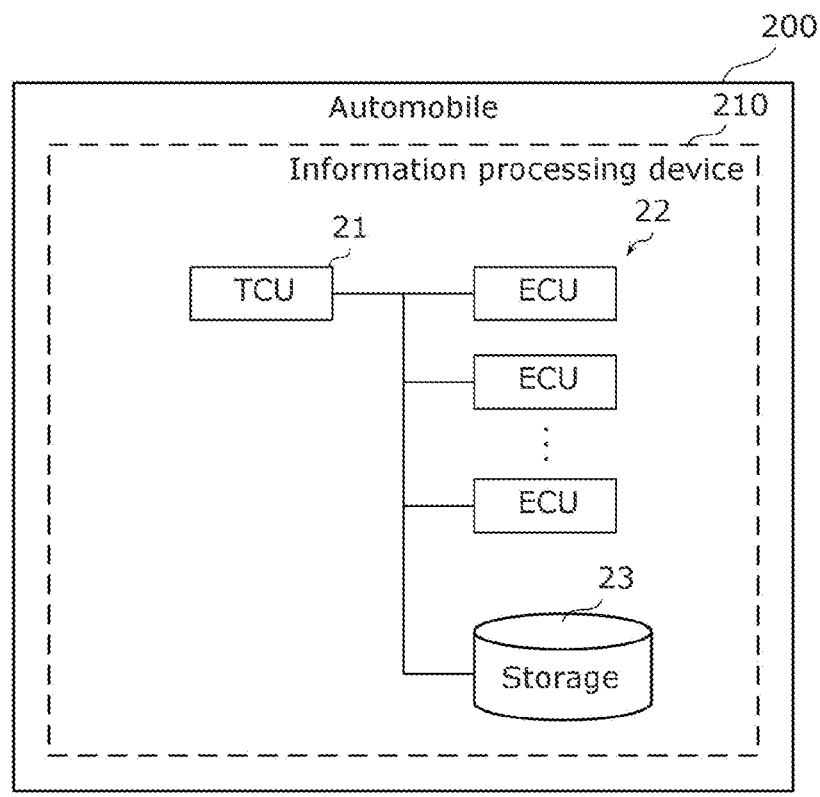
FIG. 3 is a block diagram showing an exemplary hardware configuration of a moving object according to the embodiment.

FIG. 3 is a block diagram showing an exemplary hardware configuration of information processing device 210 included in automobile 200 according to the embodiment.

As shown in FIG. 3, information processing device 210 includes, as hardware components, telematics control unit (TCU) 21, and n ECUs 22. Shown in FIG. 3 is the configuration of each of a plurality of automobiles 200. Note that information processing device 210 may not include all of the hardware components shown in FIG. 3; information processing device 210 may not include, for example, TCU 21.

TCU 21 is a communication unit by which automobile 200 wirelessly communicates with communication network 300. TCU 21 is a communication unit that includes a cellular module compliant with a mobile communications network standard.

Each of n ECUs 22 is a control circuit that controls various devices included in automobile 200, such as an engine, a motor, a meter, a transmission, a brake, a steering, a power window, an air conditioner, and so forth. N ECUs 22 are provided, for example, in one-to-one correspondence with these various devices. Each of n ECUs 22 includes a non-illustrated memory that stores a program. Such memory is, for example, a nonvolatile memory. The n ECUs are configured to be capable of communicating with one another by a communication method compliant with, for example, Ethernet®, controller area network (CAN), and so forth.

Storage 23 is a nonvolatile storage area in which a control program and so forth are held.

Figure 4:
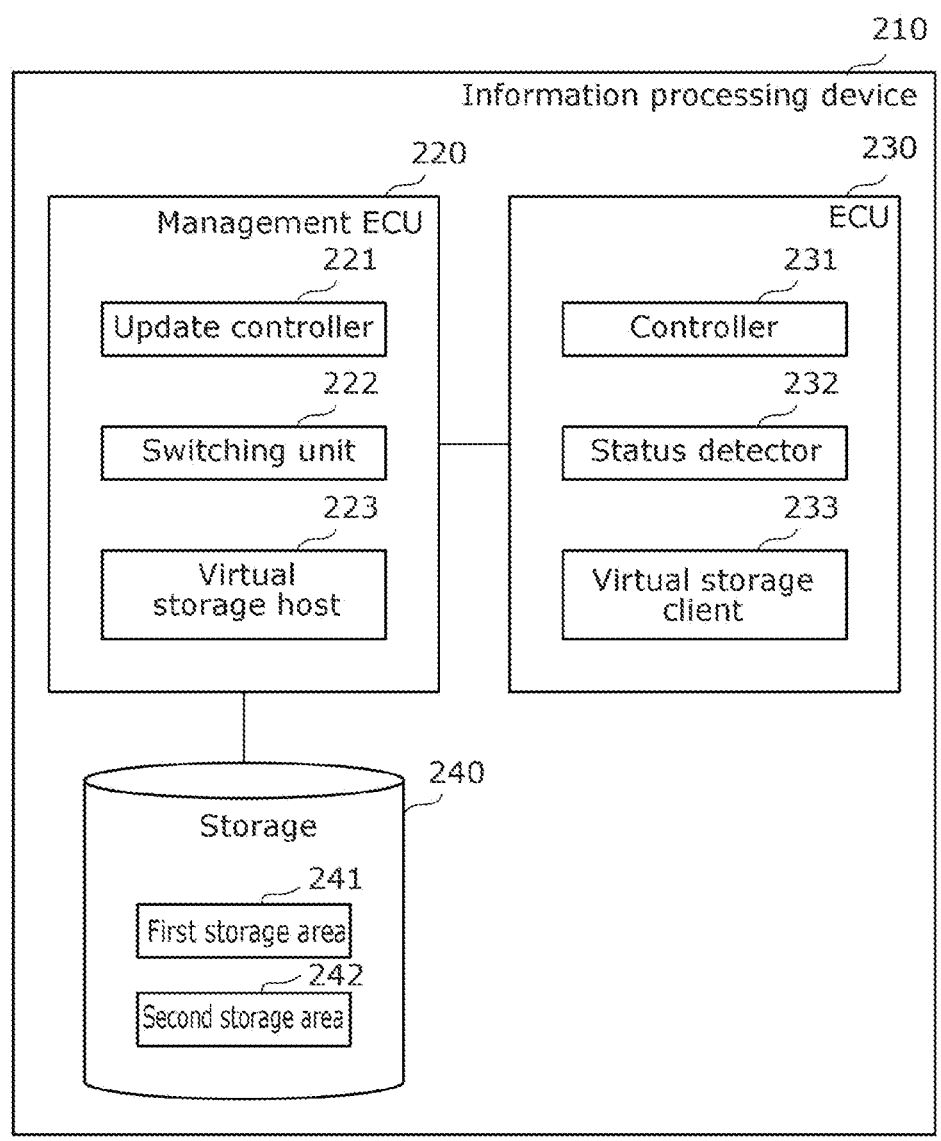
FIG. 4 is a block diagram showing an exemplary functional configuration of an information processing device according to the embodiment.

With reference to FIG. 4, the following describes the functional configuration of information processing device 210 included in automobile 200.

FIG. 4 is a block diagram showing an exemplary functional configuration of information processing device 210 according to the embodiment.

Information processing device 210 includes management ECU 220, ECU 230, and storage 240. ECU 220 and ECU 230 are configured to be capable of communicating with each other by a communication method compliant with, for example, Ethernet®, CAN, and so forth.

Management ECU 220 is an ECU that manages program update performed by ECU 230. Management ECU 220 provides ECU 230 with storage 240 serving as a virtual storage. Management ECU 220 is implemented, for example, by at least one of n ECUs 22. Management ECU 220 may include TCU 21. Management ECU 220 is an example of the second controller.

Storage 240 is provided to ECU 230 as a virtual storage via management ECU 220. The virtual storage includes first storage area 241 and second storage area 242. One of first storage area 241 and second storage area 242 stores a first program to be executed by ECU 230 on start-up. The first program is a program currently used by ECU 230. Storage 240 is implemented by storage 23.

ECU 230 accesses the storage area in storage 240 in which the first program is stored to execute the first program. The function of ECU 230 is implemented by ECU 230 executing the first program on start-up. ECU 230 is implemented, for example, by at least one of n ECUs 22 other than ECU 22 that is implemented as management ECU 220. ECU 230 is an example of the first controller.

The following describes specific functions of management ECU 220 and ECU 230.

More specifically, management ECU 220 includes update controller 221, switching unit 222, and virtual storage host 223.

Update controller 221 controls program update performed by ECU 230. More specifically, update controller 221 obtains, from an external device, a second program that is an update to the first program, and causes the remaining one of first storage area 241 and second storage area 242 of the virtual storage to store the obtained second program. The remaining one of first storage area 241 and second storage area 242 is one of these storage areas that does not store the first program currently used by ECU 230. Note that the external device is, for example, server 100 or an update device.

Update controller 221 also detects that ECU 230 has an operation anomaly when ECU 230 executes the second program. For example, update controller 221 obtains an operating status of ECU 230 at regular time intervals. As such, update controller 221 may determine that ECU 230 has an anomaly, when ECU 230 executes the second program, in the case where update controller 221 cannot obtain an operating status of ECU 230 for a predetermined or longer period after obtaining the last operating status. Alternatively, update controller 221 may determine that ECU 230 has an anomaly in the case where update controller 221 cannot obtain an operating status of ECU 230 for a predetermined or longer period after obtaining the last operating status and cannot obtain an operating status of ECU 230 after an attempt to re-start ECU 230 for a predetermined or greater number of times. Update controller 221 may also determine that ECU 230 has an anomaly when an operating status of ECU 230 which has been obtained is greatly different from a previous expectation. Here, examples of the operating status include the following items relating to a central processing unit (CPU) and a random-access memory (RAM) that are included in ECU 230: CPU usage: memory usage; the frequency of communications; communication patterns; and others. Stated differently, that the operating status is greatly different from the previous expectation refers to the case where at least one of CPU usage, memory usage, the frequency of communications, or communication patterns is out of the scope of their expectations.

After the second program is stored in the remaining one of the storage areas, both first storage area 241 and second storage area 242 of the virtual storage store the programs executed by ECU 230. In view of this, switching unit 222 serves as a processing unit that selects, as a program to be executed by ECU 230, one of the two programs stored in the two storage areas. More specifically, after the second program is stored in the remaining one of the storage areas, switching unit 222 switches the program to be executed by ECU 230 on start-up from the first program to the second program stored in the remaining one of the storage areas. Also, when update controller 221 detects an anomaly in ECU 230 that has executed the second program, switching unit 222 switches again the program to be executed by ECU 230 on start-up from the second program to the first program stored in the one of the storage areas.

Virtual storage host 223 is a processing unit that utilizes storage 23 implemented as storage 240 to provide ECU 230 with storage 240 serving as a virtual storage. Virtual storage host 223 is accessed by ECU 230 having a virtual client function, and provides real storage areas of storage 23 as virtual first storage area 241 and second storage area 242.

More specifically, ECU 230 includes controller 231, status detector 232, and virtual storage client 233.

Controller 231 is a processing unit that implements the function of ECU 230 by executing the first program. More specifically, controller 231 controls virtual storage client 233 to access storage 240 via management ECU 220, and executes the first program stored in one of first storage area 241 and second storage area 242.

Status detector 232 regularly obtains an operating status of ECU 230 at predetermined time intervals while ECU 230 is starting up, and notifies management ECU 220 of the obtained operating status.

Status detector 232 cannot notify management ECU 220 of the operating status if ECU 230 becomes unable to operate due to an anomaly. Stated differently, the failure of status detector 232 of being unable to notify management ECU 220 of the operating status indicates that ECU 230 has an operation anomaly.

Virtual storage client 233 is a processing unit that exchanges information with virtual storage host 223 of management ECU 220, thereby receiving, from virtual storage host 223, storage 240 serving as a virtual storage.

[Operation]

The following describes an operation performed by information processing device 210 with the foregoing configuration.

Figure 5:
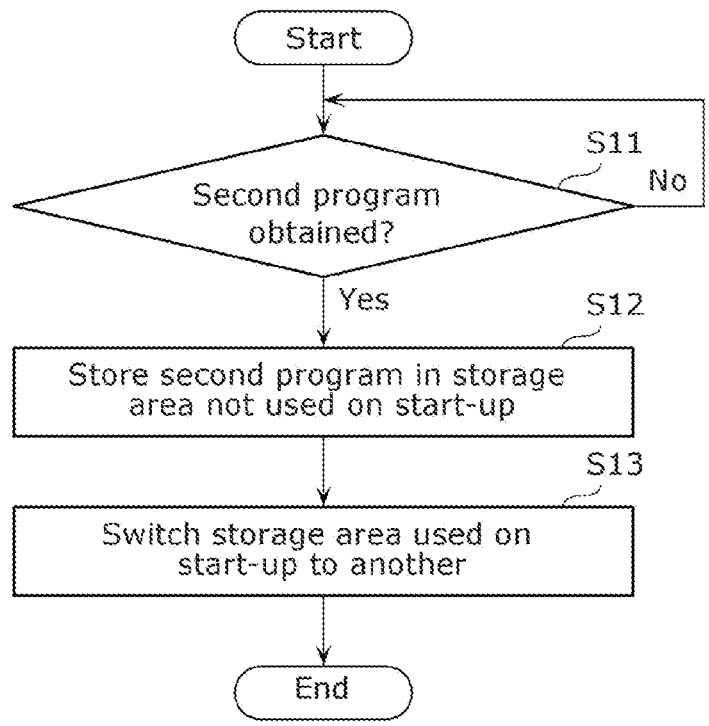
FIG. 5 is a flowchart of an exemplary program update operation performed by the information processing device according to the embodiment.

FIG. 5 is a flowchart of an exemplary program update operation performed by information processing device 210 according to the embodiment.

Management ECU 220 determines whether the second program has been obtained (S11).

When determining that the second program has been obtained (Yes in S11), management ECU 220 causes the second program to be stored in one of first storage area 241 and second storage area 242 of the virtual storage that is not used by ECU 230 on start-up (S12). When determining that the second program has not been obtained, management ECU 220 returns to step S11.

Subsequently, management ECU 220 switches the storage area to be used by ECU 230 on start-up to one of first storage area 241 and second storage area 242 which stores the second program (S13). Through the foregoing operation, management ECU 220 causes ECU 230 to execute the second program on start-up. Note that management ECU 220 re-starts ECU 230 after switching the storage area used by ECU 230 on start-up to the other storage area.

Figure 6:
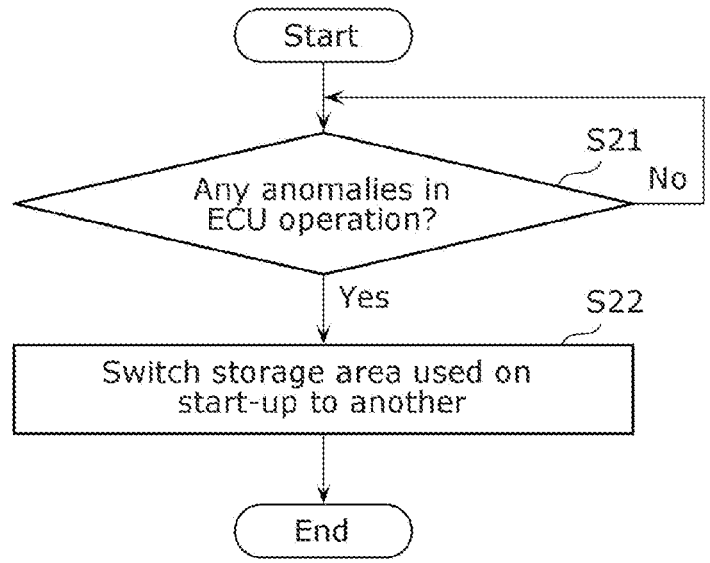
FIG. 6 is a flowchart of an exemplary program restoration operation performed by the information processing device according to the embodiment.

FIG. 6 is a flowchart of an exemplary program restoration operation performed by information processing device 210 according to the embodiment. Such restoration operation is performed after the update operation illustrated in FIG. 5 is performed.

Management ECU 220 determines whether ECU 230 that has executed the second program has an anomaly (S21).

When determining that ECU 230 has an anomaly (Yes in S21), management ECU 220 switches the storage area to be used by ECU 230 on start-up from the storage area that stores the second program to the storage area that stores the first program among first storage area 241 and second storage area 242 (S22). Through the foregoing operation, management ECU 220 causes ECU 230 to execute the first program on start-up. Note that management ECU 220 re-starts ECU 230 after switching the storage area used by ECU 230 on start-up to the other storage area.

[Effects, etc.]

In information processing device 210 according to the present embodiment, the first program executed by ECU 230 is stored in one of first storage area 241 and second storage area 242 of the virtual storage provided by management ECU 220. Upon obtainment of the second program that is an update, the second program is stored in the remaining one of the storage areas. After that, the program to be executed by ECU 230 on start-up is switched to the second program, thereby enabling to update the program of ECU 230 without using ECU 230. This configuration enables the program of ECU 230 to be updated without affecting ECU 230 in operation.

Also, in information processing device 210 according to the present embodiment, switching unit 222 switches again the program to be executed by ECU 230 on start-up from the second program to the first program stored in the one of the storage areas, when an anomaly is detected in ECU 230 that has executed the second program. With this, it is possible for switching unit 222 included in management ECU 220, which is different from ECU 230, to switch the program to be executed by ECU 230 on start-up from the second program to the first program, when an anomaly is detected in the second program. This enables to re-start ECU 230 to cause it to execute the first program that runs normally, even when ECU 230 becomes unable to start up or falls in deadlock as a result of executing the anomalous second program. This thus prevents ECU 230 from becoming unable to function.

[Variations]

(Variation 1)

Figure 7:
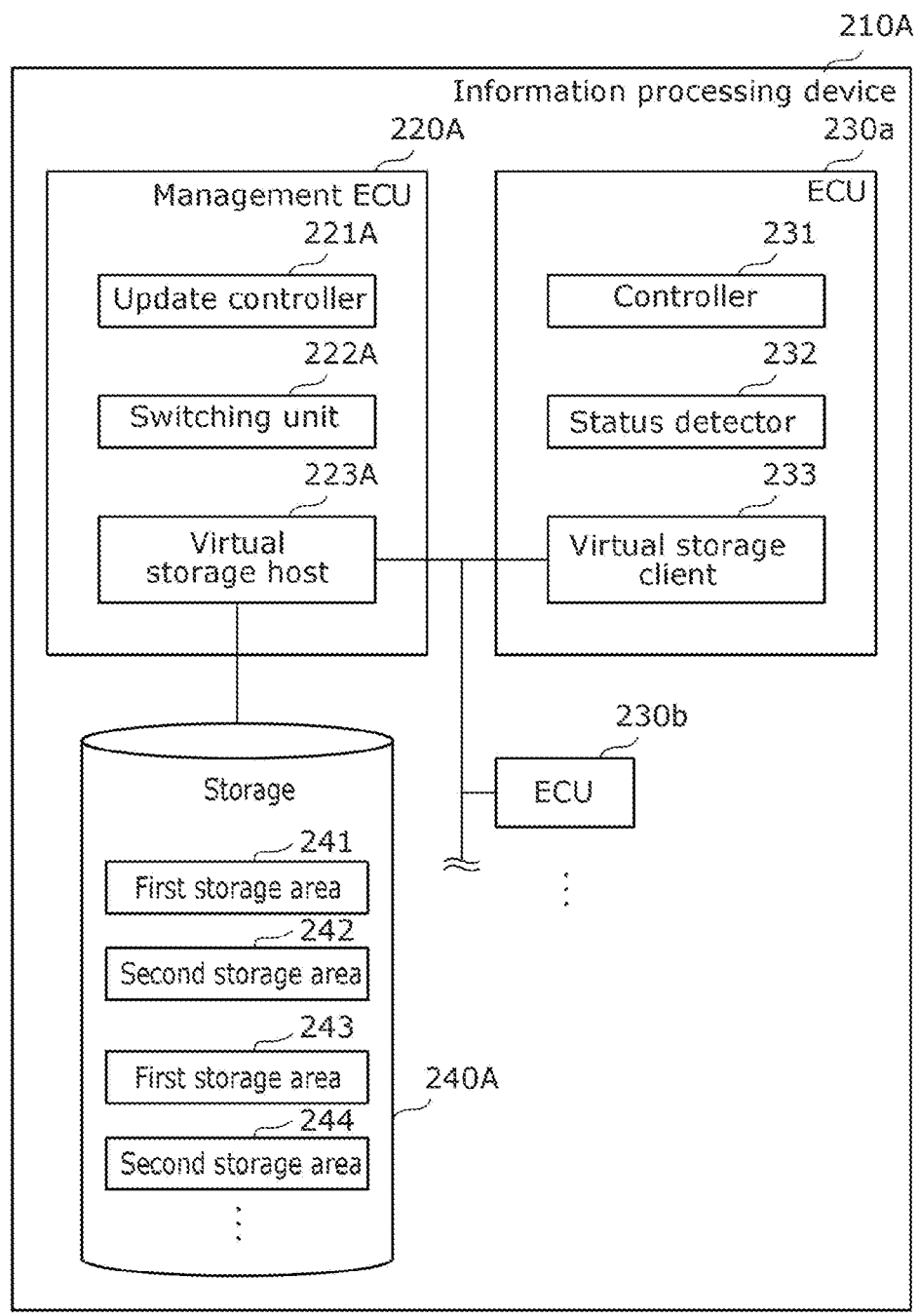
FIG. 7 is a block diagram showing an exemplary functional configuration of an information processing device according to Variation 1.

Information processing device 210 according to the foregoing embodiment has been described as an example in which management ECU 220 provides first storage area 241 and second storage area 242 as a virtual storage to single ECU 230, but the virtual storage may be provided to a plurality of ECUs 230a and 230b. FIG. 7 is a block diagram showing an exemplary functional configuration of information processing device 210A according to Variation 1.

Information processing device 210A is different from information processing device 210 according to the embodiment in that management ECU 220A provides, as a virtual storage, storage 240A to a plurality of ECUs 230a and 230b. The following description focuses on the difference from information processing device 210 according to the embodiment.

In management ECU 220A, virtual storage host 223A provides storage 240A to a plurality of ECUs 230a and 230b. Virtual storage host 223A includes a plurality of first storage areas 241 and 243 and a plurality of second storage areas 242 and 244 accessed by a plurality of ECUs 230a and 230b, respectively. More specifically, virtual storage host 223A provides first storage area 241 and second storage area 242 to ECU 230a, and provides first storage area 243 and second storage area 244 to ECU 230b. As described above, virtual storage host 223A provides two individual storage areas to each of a plurality of ECUs 230a and 230b. One of first storage area 241 and second storage area 242 stores the first program to be executed by ECU 230a on start-up. Similarly, one of first storage area 243 and second storage area 244 stores the first program to be executed by ECU 230b on start-up.

Update controller 221A performs the same process for a plurality of ECUs 230a and 230b as that performed by update controller 221 according to the embodiment. More specifically, update controller 221A obtains, from the external device, the second program that is an update to the first program of ECU 230a, and causes the remaining one of first storage area 241 and second storage area 242 of the virtual storage to store the obtained second program. Similarly, update controller 221A obtains, from the external device, the second program that is an update to the first program of ECU 230b, and causes the remaining one of first storage area 243 and second storage area 244 of the virtual storage to store the obtained second program.

After the second program of ECU 230a is stored in the remaining one of first storage area 241 and second storage area 242, switching unit 222A switches the program to be executed by ECU 230a on start-up from the first program to the second program stored in the remaining one of the storage areas. Similarly, after the second program of ECU 230b is stored in the remaining one of first storage area 243 and second storage area 244, switching unit 222A switches the program to be executed by ECU 230b on start-up from the first program to the second program stored in the remaining one of the storage areas.

Also, when update controller 221A detects an anomaly in ECU 230a that has executed the second program, switching unit 222A switches again the program to be executed by ECU 230a on start-up from the second program to the first program stored in the one of the storage areas. Similarly, when update controller 221A detects an anomaly in ECU 230b that has executed the second program, switching unit 222A switches again the program to be executed by ECU 230b on start-up from the second program to the first program stored in the one of the storage areas.

Information processing device 210A according to Variation 1 is capable of updating the program of each of a plurality of ECUs 230a and 230b without affecting such ECU.

Note that there is a case where a plurality of ECUs 230a and 230b according to Variation 1 have a dependence relation. Having a dependence relation means that ECUs are in a relation that the function of one of the ECUs is implemented on the assumption that the function of the other ECU is implemented. Stated differently, in ECUs having a dependence relation, one of the ECUs cannot operate normally unless the other of the ECUs operates normally. As such, switching unit 222A may perform program switching in consideration of such dependence relation. More specifically, when an anomaly is detected in at least one of ECUs 230a and 230b in a dependence relation in executing the second program, switching unit 222A switches again the program to be executed by each of ECUs 230a and 230b on start-up from the second program to the first program stored in one of the storage areas.

With this, it is possible for switching unit 222A included in management ECU 220A, which is different from ECUs 230a and 230b, to switch the program to be executed on start-up by each of all ECUs 230a and 230b in a dependence relation from the second program to the first program when an anomaly is detected in one of ECUs 230a and 230b that has executed the second program. This enables to re-start all of ECUs 230a and 230b to cause them to execute the first program that runs normally, even when ECU 230a becomes unable to start up or falls in deadlock as a result of executing the anomalous second program, affecting ECU 230b. This thus prevents a plurality of ECUs 230a and 230b from becoming unable to function.

(Variation 2)

In the foregoing embodiment, management ECU 220 and ECU 230 are implemented by ones of n ECUs 22, but the present disclosure is not limited to this configuration; management ECU 220 and ECU 230 may thus be implemented by at least one processor and a memory or a storage that stores programs for implementing a virtualized environment.

Figure 8:
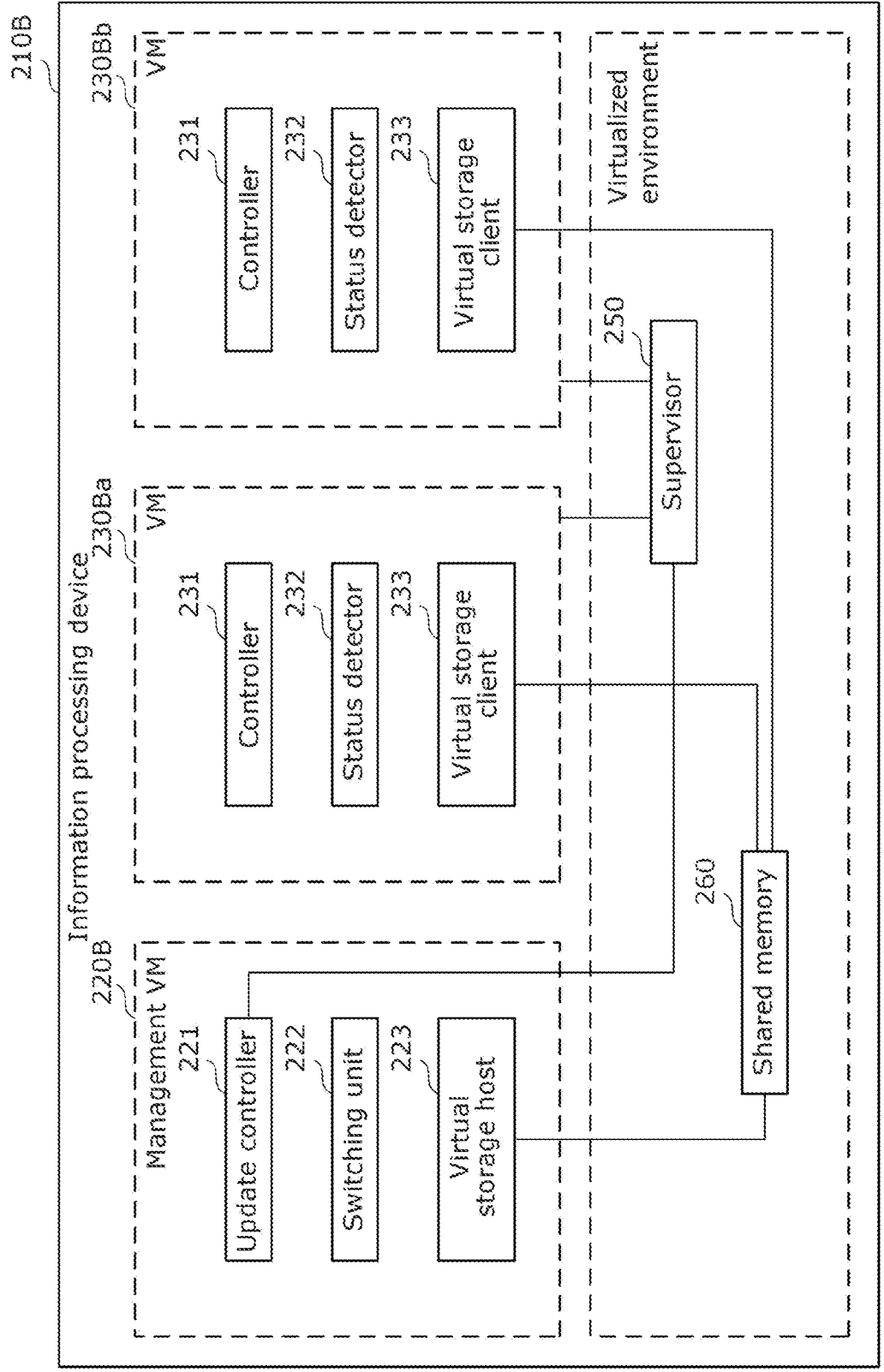
FIG. 8 is a block diagram showing an exemplary functional configuration of an information processing device according to Variation 2.
Figure 9:
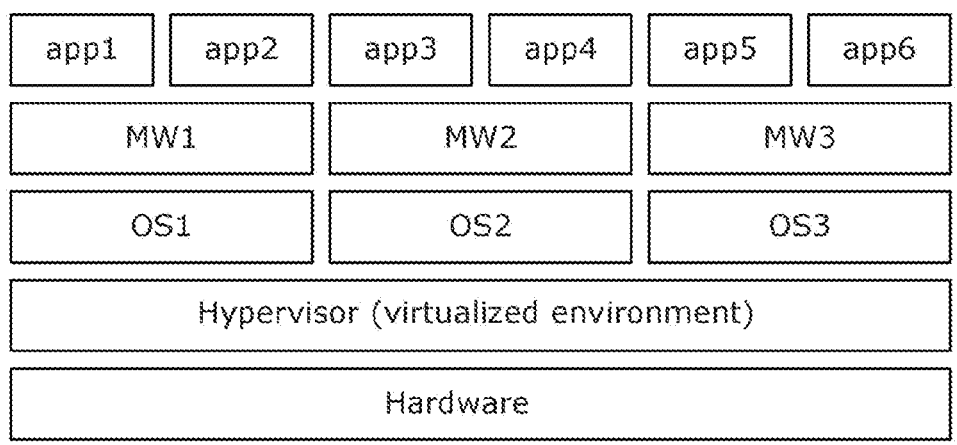
FIG. 9 is a diagram showing the configuration of a virtual machine that implements the function of the information processing device.

FIG. 8 is a block diagram showing an exemplary functional configuration of information processing device 210B according to Variation 2. FIG. 9 is a diagram showing the configuration of a virtual machine that implements the function of information processing device 210B.

As shown in FIG. 8, information processing device 210B includes management virtual machine (VM) 220B, a plurality of virtual machines (VMs) 230Ba and 230Bb, supervisor 250, and shared memory 260. As shown in FIG. 9, information processing device 210B includes a virtual machine that is virtually implemented by software on at least one hardware. The function of information processing device 210B is implemented, for example, by hypervisor-based virtualized environment.

Management VM 220B has the same function as that of management ECU 220 according to the embodiment. A plurality of VMs 230Ba and 230Bb have the same functions as those of ECUs 230a and 230b according to the embodiment.

Supervisor 250 regularly obtains operating statuses from status detectors 232 of VMs 230Ba and 230Bb, and outputs the obtained operating statuses to update controller 221 of management VM 220B. As described above, supervisor 250 is implemented as a processing unit different from management VM 220B, VM 230Ba, and VM 230Bb. This enables a more effective obtainment of an operating status from each VM without depending on management VM 220B, VM 230Ba, and VM 230Bb.

Shared memory 260 provides a storage area that is enabled by a virtual storage function. As described above, shared memory 260 enables the storage area for the program of each VM, thereby enabling a fast passing of information between management VM 220B, VM 230Ba, and VM 230Bb.

(Variation 3)

In the foregoing embodiment, update controller 221 included in management ECU 220 performs a process of obtaining, from the external device, the second program that is an update to the first program, and causing the remaining one of first storage area 241 and second storage area 242 of the virtual storage to store the obtained second program, but the present disclosure is not limited to this configuration. ECU 230 may further include an update controller that performs the foregoing process. This enables the rewriting in accordance with the function of ECU 230 in the case where ECU 230 has a special rewriting function.

(Variation 4)

In the foregoing embodiment, management ECU 220 includes switching units 222 and 222A, but the present disclosure is not limited to this configuration; a processing unit or a controller different from management ECU 220 and ECU 230 may include switching units 222 and 222A.

(Variation 5)

In the foregoing embodiment, automobile 200 is described as an exemplary moving object, but the moving object is not limited to automobile 200; the moving object may thus be another conveyance, an unmanned vehicle, a flying object such as a drone, and so forth. The moving object includes information processing device 210 and the main body of the moving object that includes information processing device 210. Also, information processing device 210 is not limited, for example, to a computer system included in the moving object, and thus may be applied to any computer systems that include a plurality of controllers.

[Others]

Each of the elements in each of the foregoing embodiment and its variations 1 through 4 may be configured in the form of an exclusive hardware product, or may be realized by executing a software program suitable for the element. Each of the elements may be realized by means of a program executing unit, such as a CPU and a processor, reading and executing the software program recorded on a recording medium such as a hard disk or a semiconductor memory. Here, the software program for realizing the distribution rule generation method and so forth according to each embodiment is a program described below.

That is to say, the program causes a computer to execute an information processing method performed by an information processing device including a first controller and a second controller that provides the first controller with a virtual storage including a first storage area and a second storage area, one of which stores a first program to be executed by the first controller on start-up. Such information processing method includes: obtaining, from an external device, a second program that is an update to the first program; causing a remaining one of the first storage area and the second storage area to store the second program obtained in the obtaining; and switching a program to be executed by the first controller on start-up from the first program to the second program stored in the remaining one of the storage areas, after the second program is stored in the causing in the remaining one of the storage areas.

The embodiment has been described above to illustrate the technology according to the present disclosure, for which the accompanying drawings and detailed description have been provided.

The structural elements described in the accompanying drawings and detailed description can thus include not only the structural elements essential to solve the problems, but also structural elements unessential to solve the problems to illustrate the foregoing technology. As such, the fact that such unessential structural elements are illustrated in the accompanying drawings and detailed description should not lead to the immediate conclusion that such unessential structural elements are essential.

Also note that the foregoing embodiment is intended to illustrate the technology according to the present disclosure, and thus allow for various modifications, replacements, additions, omissions, and so forth made thereto within the scope of the claims and its equivalent scope.

Further Information About Technical Background to This Application

The disclosures of the following patent applications including specification, drawings and claims are incorporated herein by reference in their entirety: Japanese Patent Application No. 2019-221804 filed on Dec. 9, 2019.

INDUSTRIAL APPLICABILITY

The present disclosure is applicable to an information processing device and so forth capable of updating a program of a target controller to be updated without affecting such controller.

The invention claimed is:

1. An information processing device, comprising:
a first controller;
a second controller that is connected to the first controller and that provides the first controller with a virtual storage, the virtual storage being in communication with the second controller and including a first storage area and a second storage area, one of which stores a first program to be executed by the first controller on start-up, the virtual storage not being in direct communication with the first controller; and
an update controller that obtains, from an external device, a second program that is an update to the first program, and causes a remaining one of the first storage area and the second storage area to store the second program obtained, wherein
the update controller switches a program to be executed by the first controller on start-up from the first program to the second program stored in the remaining one of the storage areas, after the second program is stored in the remaining one of the storage areas, whereby the first program for the start-up of the first controller is updated to the second program without using the first controller.

2. The information processing device according to claim 1,
wherein when an anomaly is detected in the first controller that has executed the second program, the update controller switches again the program to be executed by the first controller on start-up from the second program to the first program stored in the one of the storage areas.

3. The information processing device according to claim 1, wherein the first controller includes the update controller.

4. The information processing device according to claim 1, wherein the second controller includes the update controller.

5. The information processing device according to claim 1, wherein the information processing device comprises a plurality of first controllers each being the first controller, and
the virtual storage provided by the second controller includes a plurality of first storage areas and a plurality of second storage areas that are accessed by the plurality of first controllers, the plurality of first storage areas each being the first storage area and the plurality of second storage areas each being the second storage area.

6. The information processing device according to claim 5, wherein the plurality of first controllers include a plurality of dependent controllers having a dependence relation, for each of the plurality of dependent controllers,
the virtual storage includes a first dependent storage area and a second dependent storage area that correspond to the dependent controller among the plurality of first storage areas and the plurality of second storage areas,
one of the first dependent storage area and the second dependent storage area that correspond to the dependent controller stores the first program to be executed by the dependent controller on start-up,
when obtaining, from the external device, the second program that is the update for the dependent controller, the update controller causes a remaining one of the first dependent storage area and the second dependent storage area that correspond to the dependent controller to store the second program obtained, and
the update controller switches the program to be executed by the dependent controller on start-up from the first program to the second program stored in the remaining one of the dependent storage areas, after the second program is stored in the remaining one of the dependent storage areas, and
when an anomaly is detected in at least one of the plurality of dependent controllers that has executed the second program, the update controller switches again the program to be executed by each of the plurality of dependent controllers on start-up from the second program to the first program stored in the one of the dependent storage areas.

7. The information processing device according to claim 1, wherein the first controller and the second controller are electronic control units (ECUs).

8. The information processing device according to claim 1, wherein the first controller and the second controller are capable of communicating with each other over a controller area network (CAN).

9. A moving object, comprising:
the information processing device according to claim 1; and
a moving object main body including the information processing device.

10. An information processing method performed by an information processing device, the information processing device including a first controller and a second controller, the second controller providing the first controller with a virtual storage, the virtual storage including a first storage area and a second storage area, one of which stores a first program to be executed by the first controller on start-up, the information processing method comprising:
obtaining, from an external device, a second program that is an update to the first program;
causing a remaining one of the first storage area and the second storage area to store the second program obtained in the obtaining; and
switching a program to be executed by the first controller on start-up from the first program to the second program stored in the remaining one of the storage areas, after the second program is stored, in the causing, in the remaining one of the storage areas,
wherein the second controller is connected to the first controller, the virtual storage is in communication with the second controller, the virtual storage is not in direct communication with the first controller, and the first program for the start-up of the first controller is updated to the second program without using the first controller.

* * * * *